a) BASED ON THE SPECIFIC GRAVITY ON AMMONIA AT 60°F AND 1 ATM.

VISCOSITY VS. AMMONIA CONTENT FOR RESIDUAL FUEL OIL AMMONIA BLENDS AT 65°F AND 400 PSIG SUCTION PRESSURE a) BASED ON THE SPECIFIC GRAVITY ON AMMONIA AT 60°F AND 1 ATM.

VISCOSITY VS. TEMPERATURE FUNCTIONS FOR ANHYDROUS AMMONIA RESIDUAL FUEL OIL BLENDS

INVENTORS:
PAUL R. SCOTT
RONALD F. SCHEUERMAN
BY:
THEIR AGENT

United States Patent Office 3,480,024
Patented Nov. 25, 1969

3,480,024
PIPELINE TRANSPORTATION OF LIQUID ANHYDROUS AMMONIA AND LIQUID HYDROCARBON SOLUTIONS
Paul R. Scott, Houston, Tex., and Ronald F. Scheuerman, El Cerrito, Calif., assignors to Shell Oil Company, New York, N.Y., a corporation of Delaware
Filed Dec. 28, 1967, Ser. No. 694,242
Int. Cl. F17c *1/04, 1/16*
U.S. Cl. 137—1          5 Claims

ABSTRACT OF THE DISCLOSURE

A method of transporting anhydrous liquid ammonia through pipelines as a solution in a liquid hydrocarbon.

Figure 1:
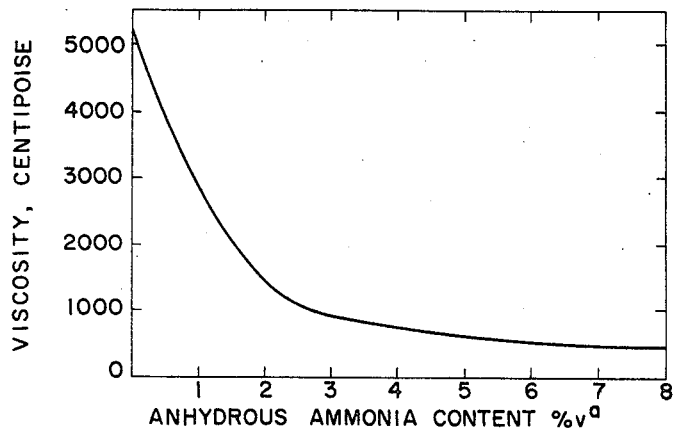

The present invention relates to pipeline transportation of anhydrous liquid ammonia and more particularly to the transportation through pipelines over great distances of anhydrous liquid ammonia as a solution in a liquid hydrocarbon such as a crude oil and fractions thereof.

Background of the invention

Anhydrous liquid ammonia is an important chemical product useful per se and as an intermediate in the preparation and production of chemical compounds for use in various applications such as in the metal, petroleum, rubber, textiles and agricultural industries and chemical manufacture. Because of its chemical nature and activity it is difficult and hazardous to handle. In addition, the only convenient means of transporting it currently is by truck, tank cars or barges, whose bulk capacities are limited and therefore make the transportation costs high and extremely unattractive. Also, such means of transportation of anhydrous ammonia presents a constant hazard problem.

It is an object of the present invention to transport through pipelines anhydrous liquid ammonia in a liquid hydrocarbon.

Still another object of the present invention is to transport through pipelines a solution of anhydrous liquid ammonia in a petroleum liquid under controlled pressure conditions.

Still another object of the present invention is to transport through pipelines solutions of anhydrous liquid ammonia in a waxy crude oil under conditions so that each liquid exerts beneficial effects on the other and thereby improved production and pumping conditions are obtained.

Still another object of the present invention is to transport through pipelines solutions of anhydrous liquid ammonia and petroleum liquids under pressure and temperature conditions whereby chemical reaction takes place and where at the terminal end of the line the two liquids and reaction products are separated.

These and other objects will be apparent from the following description of the invention.

Summary of the invention

It has now been discovered that anhydrous liquid ammonia can be transported in large bulk safely, conveniently and at substantially reduced cost by forming a solution of anhydrous liquid ammonia in a liquid hydrocarbon such as a crude oil and fractions thereof, e.g., lubricating oil, fuel oil, gasoline, etc., and pumping the solution mixture under such conditions that the pressure in the pipeline is maintained above the bubble pressure of the ammonia. The oil/ammonia ratio can vary over wide limits thereby providing great flexibility as to the amount of ammonia which can be thus transported by this means. It is preferable to maintain the pressure in the pipe at above about 40 p.s.i.a. at 20° F. or 300 p.s.i.a. at 120° F.

Any suitable means can be used to form the anhydrous liquid ammonia-oil solution and introduce it into the pipeline for transportation to a terminal point where the two materials can be separated by conventional means known in the art, e.g., flashing, vaporization, liquid-liquid or gas-liquid separation, and the like. Thus, one method of forming the solution is to inject anhydrous liquid ammonia into a pipeline carrying a petroleum liquid such as a crude oil and maintaining the pressure in the pipeline above 48 p.s.i.a. at 20° F. or 286 p.s.i.a. at 120° F. to inhibit bubble formation.

Description of the preferred embodiments

Figure 2:
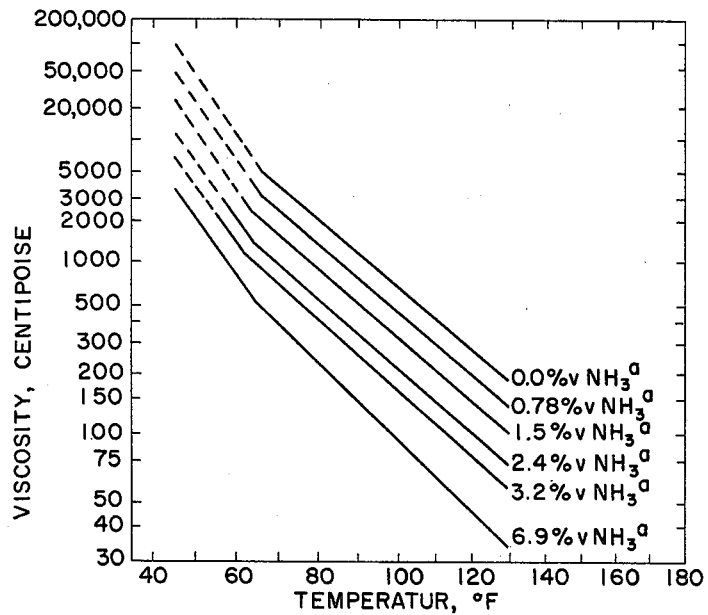

One feature of this invention is to facilitate the transport through pipelines of waxy crude oil and anhydrous liquid ammonia by this means since it has been found that the ammonia which may comprise from 1% to 10% or more of the mixture inhibits the separation of the waxy components of the oil out of solution and thereby prevents or inhibits plugging of the line if the waxy oil were pumped per se through the pipeline. Also, as seen in FIGURES 1 and 2, anhydrous liquid ammonia has been found to effectively reduce friction and the viscosity of the oil thereby reducing pumping costs and pumping pressures for a given flow rate and increases the through-put capacity of the pipeline. Also, under such conditions the left of the pipeline is increased since corrosion appears to be inhibited. Therefore not only can anhydrous liquid ammonia be effectively transported through pipelines but in the case where waxy crudes are used as the liquid carrier the ammonia prevents the formation of waxy deposits on the pipeline walls which under ordinary conditions tend to separate and plug the line and which results in shut down of the pipeline, increasing greatly to the cost of the operation. Thus, it has been observed that pipeline transportation of solutions of anhydrous liquid ammonia and waxy crudes, separation of wax and the plugging of the line by wax deposition is alleviated.

Ammonia is easily removed from oils as indicated in Table 1 and the physical properties of the oils are not affected significantly.

TABLE 1.—COMPARISON OF PROPERTIES OF RESIDUAL FUEL OIL BEFORE AND AFTER PUMPING WITH ANHYDROUS AMMONIA

|  | Before addition of ammonia | After pumping with 6.9% v. NH$_3$ and flashing at 76° F. and one atmosphere |
|---|---|---|
| Vapor pressure, p.s.i.a. | 0.1 | 0.1 |
| Pour point, ° F. | 50 | 50 |
| Viscosity, cps.: | | |
| 100° F. | 660 | 670 |
| 120° F. | 280 | 280 |

Also, when oils requiring some purification are used as the carrier vehicle the anhydrous liquid ammonia as it is transported through a pipeline by means of said vehicle functions as a chemical purifier removing acidic components and the like from the oil so that at the terminal end of the line on separation of the oil it is found to be in a purified form and the impurities can be removed from the ammonia phase of the mixture more easily by suitable chemical means.

The process of the present invention is particularly applicable where the manufacture of the ammonia is accessible to sources of oil supply such as oil fields or petroleum refinery plants so that both materials can be pumped into a pipeline for transportation to a terminal station where they are separated and processed or shipped as desired.

As an example about 20% anhydrous liquid ammonia, the ammonia having the following properties:

| | |
|---|---|
| Color | Colorless. |
| Molecular weight | 17.03. |
| Boiling point at 760 mm. Hg | $-33.35°$ C., ($-28°$ F.). |
| Freezing point at 760 mm. Hg. | $-77.7°$ C., ($-107.9°$ F.). |
| Critical temperature | 133.0° C., (271.4° F.). |
| Critical pressure (absolute) | 112.75 atm., (1657 lbs./in.$^2$). |
| Vapor density at boiling point and 760 mm. Hg. | 0.00089 g./ml., (0.05555 lb./ft.$^3$). |
| Liquid density at boiling point and 760 mm. Hg. | 0.674 g./ml., (42.57 lb./ft.$^3$). |
| Specific gravity of liquid at boiling point (water at 4° C.=1). | 0.6819. |
| Specific heat of vapor at 15° C. and 760 mm. Hg: | |
| Cp. | 0.52 cal./g./° C., (0.52 B.t.u./lb./° F). |
| Cv. | 0.39 cal./g./° C., (0.39 B.t.u./lb./° F.). |
| Specific heat of liquid at 15° C. and 760 mm. Hg: | |
| Cp. | 1.08 cal./g./° C., (1.08 B.t.u./lb./° F.). |
| Latent heat of vaporization at boiling point and 760 mm. Hg. | 327.5 cal./g., (589.4 B.t.u./lb.). |
| Vapor pressure (absolute): | |
| $-40°$ F. | 0.708 atm., (10.41 lb./in.$^2$). |
| $-20°$ F. | 1.245 atm., (18.30 lb./in.$^2$). |
| 0° F. | 2.070 atm., (30.42 lb./in.$^2$). |
| 20° F. | 3.280 atm., (48.21 lb./in.$^2$). |
| 40° F. | 4.989 atm., (73.32 lb./in.$^2$). | was injected into a pipeline carrying waxy crude oil having a viscosity of about 100,000 centipoises to form a solution which was pumped through the pipeline at 286 p.s.i.a. at 120° F. to a terminal end. The pipeline was observed to be clean and free of waxy deposits and no increase in friction was noted and pumping requirements were found to be less than that required to pump the same waxy crude oil per se through the same pipeline. The ammonia was readily separated from the oil at the terminal end of the pipeline.

The foregoing description of the invention is merely intended to be explanatory thereof. Various changes in the details of the described method may be made within the scope of the appended claims without departing from the spirit of the invention.

We claim as our invention:

1. A method for transporting anhydrous liquid ammonia through a pipeline to a terminal comprising:
   forming a solution of anhydrous liquid ammonia and a liquid hydrocarbon;
   injecting the solution into a pipeline;
   maintaining the pressure in the pipeline above the bubble pressure of the ammonia; and
   flowing the solution through the pipeline to a terminal station.

2. The method of claim 1 wherein the solution is formed in the pipeline by injecting the anhydrous liquid ammonia into a pipeline containing a liquid hydrocarbon.

3. The method of claim 2 wherein the liquid hydrocarbon is a petroleum oil.

4. The method of claim 2 wherein the liquid hydrocarbon is a waxy crude oil and the pressure in the line is greater than about 286 p.s.i.a. at 120° F.

5. A method for transporting anhydrous liquid ammonia through a pipeline comprising:
   injecting the 10–50% anhydrous liquid ammonia into a pipeline containing waxy crude oil and forming a solution of ammonia and the oil;
   maintaining the pressure in the line at least around 286 p.s.i.a. at 120° F.;
   flowing the solution through the pipeline to a terminal station; and
   separating the two materials into separate phases.

References Cited

UNITED STATES PATENTS

| | | | |
|---|---|---|---|
| 2,533,878 | 12/1950 | Clark | 137—13 |
| 3,006,354 | 10/1961 | Sommer | 137—13 |

ALAN COHAN, Primary Examiner